(12) United States Patent
Takahashi et al.

(10) Patent No.: US 10,693,123 B2
(45) Date of Patent: Jun. 23, 2020

(54) POSITIVE ELECTRODE AND SECONDARY BATTERY USING SAME

(71) Applicant: NEC Corporation, Tokyo (JP)

(72) Inventors: Makiko Takahashi, Tokyo (JP); Takehiro Noguchi, Tokyo (JP); Yuukou Katou, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 15/502,123

(22) PCT Filed: Aug. 6, 2015

(86) PCT No.: PCT/JP2015/072345
§ 371 (c)(1),
(2) Date: Feb. 6, 2017

(87) PCT Pub. No.: WO2016/021684
PCT Pub. Date: Feb. 11, 2016

(65) Prior Publication Data
US 2017/0229704 A1    Aug. 10, 2017

(30) Foreign Application Priority Data
Aug. 7, 2014 (JP) .................. 2014-161123

(51) Int. Cl.
| | |
|---|---|
| *H01M 4/131* | (2010.01) |
| *H01M 4/505* | (2010.01) |
| *H01M 4/525* | (2010.01) |
| *H01M 4/48* | (2010.01) |
| *H01M 4/38* | (2006.01) |
| *H01M 4/36* | (2006.01) |
| *B60L 50/64* | (2019.01) |
| *C01G 53/00* | (2006.01) |
| *H01M 4/133* | (2010.01) |
| *H01M 4/587* | (2010.01) |
| *H01M 4/62* | (2006.01) |
| *H01M 4/66* | (2006.01) |
| *H01M 10/0525* | (2010.01) |
| *H01M 10/0568* | (2010.01) |
| *H01M 10/0569* | (2010.01) |

(Continued)

(52) U.S. Cl.
CPC ............. *H01M 4/131* (2013.01); *B60L 50/64* (2019.02); *C01G 53/50* (2013.01); *C01G 53/52* (2013.01); *H01M 4/133* (2013.01); *H01M 4/364* (2013.01); *H01M 4/366* (2013.01); *H01M 4/38* (2013.01); *H01M 4/48* (2013.01); *H01M 4/505* (2013.01); *H01M 4/525* (2013.01); *H01M 4/587* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 10/0585* (2013.01); *C01P 2002/32* (2013.01); *C01P 2006/40* (2013.01); *H01M 4/0404* (2013.01); *H01M 4/0435* (2013.01); *H01M 4/1391* (2013.01); *H01M 4/1393* (2013.01); *H01M 4/386* (2013.01); *H01M 2004/021* (2013.01); *H01M 2004/027* (2013.01); *H01M 2004/028* (2013.01); *H01M 2220/20* (2013.01); *Y02E 60/122* (2013.01); *Y02P 70/54* (2015.11); *Y02T 10/7011* (2013.01)

(58) Field of Classification Search
CPC ...... H01M 4/131; H01M 4/133; H01M 4/364; H01M 4/366; H01M 4/38; H01M 4/48; H01M 4/505; H01M 4/525; H01M 4/587; H01M 4/623; H01M 4/625; H01M 4/661; H01M 10/0525; H01M 10/0568; H01M 10/0569; H01M 10/0585; H01M 2004/027; H01M 2004/028; H01M 2004/021; H01M 2220/20; Y02E 60/122; Y02T 10/7011
See application file for complete search history.

(56) References Cited

U.S. PATENT DOCUMENTS

| | | |
|---|---|---|
| 2006/0093914 A1 | 5/2006 | Tanaka et al. |
| 2011/0311869 A1 | 12/2011 | Oh et al. |
| 2013/0316229 A1 | 11/2013 | Sawa et al. |

FOREIGN PATENT DOCUMENTS

| | | |
|---|---|---|
| EP | 1347524 A1 | 9/2003 |
| EP | 2541654 A2 | 1/2013 |

(Continued)

OTHER PUBLICATIONS

International Search Report corresponding to PCT/JP2015/072345 dated Oct. 13, 2015 (2 pages).

(Continued)

*Primary Examiner* — Laura Weiner
(74) *Attorney, Agent, or Firm* — Wilmer Cutler Pickering Hale and Dorr LLP

(57) ABSTRACT

The present invention relates to a positive electrode comprising a Mn composite oxide having a tetragonal structure represented by formula (1): $Li_a(M_xMn_{2-x-y}Y_y)(O_{4-w}Z_w)$ (wherein $1<a\leq2.6$, $0\leq x\leq1.2$, $0\leq y$, $x+y<2$, $0\leq w\leq1$; M is at least one selected from the group consisting of Co, Ni, Fe, Cr and Cu; Y is at least one selected from the group consisting of Li, B, Na, Mg, Al, Ti, Si, K and Ca; Z is at least one of F or Cl; and a composite oxide having a layered structure represented by formula (2): $Li(Li_xM_{1-x-y}Y_y)O_2$ (wherein $0\leq x<0.3$, $0\leq y<0.3$; M is at least one selected from the group consisting of Co, Fe, Ni and Mn; Y is at least one selected from the group consisting of Mg, Al, Zr, Ti and Zn. According to the present invention, a lithium secondary battery having a high capacity and being excellent in cycle life can be provided.

12 Claims, 2 Drawing Sheets

(51) Int. Cl.
*H01M 10/0585* (2010.01)
*H01M 4/02* (2006.01)
*H01M 4/04* (2006.01)
*H01M 4/1391* (2010.01)
*H01M 4/1393* (2010.01)

(56) References Cited

FOREIGN PATENT DOCUMENTS

| | | |
|---|---|---|
| EP | 2672561 A1 | 12/2013 |
| JP | H09-293512 A | 11/1997 |
| JP | H09-306475 A | 11/1997 |
| JP | H10-149828 A | 6/1998 |
| JP | H10-302766 A | 11/1998 |
| JP | 2996234 B1 | 12/1999 |
| JP | 3028582 B2 | 4/2000 |
| JP | 2000-260423 A | 9/2000 |
| JP | 2001-122628 A | 5/2001 |
| JP | 2001-126731 A | 5/2001 |
| JP | 2002-203553 A | 7/2002 |
| JP | 2002-203558 A | 7/2002 |
| JP | 2003-331824 A | 11/2003 |
| JP | 2007-103339 A | 4/2007 |
| JP | 2008-084743 A | 4/2008 |
| JP | 4458232 B2 | 4/2010 |
| JP | 2010-198899 A | 9/2010 |
| JP | 2013-051202 A | 3/2013 |
| JP | 2013-520782 A | 6/2013 |
| JP | 5278994 B2 | 9/2013 |

OTHER PUBLICATIONS

Japanese Decision to Grant a Patent issued in Japanese Patent Application No. 2016-540737, dated Sep. 24, 2019, 5 pages.

POSITIVE ELECTRODE AND SECONDARY BATTERY USING SAME

CROSS-REFERENCE TO RELATED APPLICATIONS

This application is a national stage application of International Application No. PCT/JP2015/072345 entitled "Positive Electrode and Secondary Battery Using Same" filed on Aug. 6, 2015, which claims priority to Japanese Application No. 2014-161123 filed on Aug. 7, 2014, the disclosures of which are hereby incorporated by reference in their entirety.

TECHNICAL FIELD

The present invention relates to a positive electrode, specifically a positive electrode for a secondary battery, further relates to a secondary battery using the positive electrode, particularly to a lithium ion secondary battery, and a method for producing these.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power sources for automobiles and electrical storage devices for smart grids, have attracted attention.

Demand for lithium ion secondary batteries has increased, and as batteries are used in various fields, further higher energy density of batteries is required. As a positive electrode active material of a lithium secondary battery (lithium ion secondary battery), use of materials of having a layered structure such as $LiCoO_2$, $LiNiO_2$, $LiNi_{1/3}Co_{1/3}Mn_{1/3}O_2$ may be exemplified. A feature of these materials is that an average discharge potential of 3.7 V to 4.0 V versus Li can be obtained with a discharge capacity of 150 mAh/g or more. Since these materials can increase the energy density of the battery, they have been widely used as small portable batteries. However, Ni and Co are disadvantageous in the case of forming a large-sized battery in terms of high cost of materials.

As another positive electrode material having a layered structure which has high energy density, examples of using of $Li_2MnO_3$—$LiMO_2$(M=Mn, Co, Ni) and a Li rich layered compound for example, represented by $Li(Ni_xLi_{(1/3-2x/3)}Mn_{(2/3-x/3)})O_2$ as a positive electrode active material have been reported in recent years. These materials have an advantage that the charge termination voltage is about 4.8 V, which is higher than that of the conventional positive electrode active material having a layered structure, and energy density is high. When these Li rich layered compounds are used as positive electrode active materials under a high temperature such as 45° C. or low charge and discharge rate such as 0.025 C (herein, when a battery having a certain capacity is discharged with a constant current, the current which finishes discharge in exactly one hour is referred to as 1 C), a high capacity of 200 mAh/g or more can be obtained. However, the problem was found after the investigation, that under high charge-discharge rate such as 1 C or more at a temperature of 20° C., capacity is little exhibited. This is considered to be due to the low ionic conductivity and electronic conductivity of the Li rich layered compound, and thus there is room for improvement as a characteristic of the battery to be normally used.

On the other hand, another candidate includes a material of spinel structure typified by $LiMn_2O_4$. Discharge capacity is about 110 mAh/g, the average discharge voltage is about 4.0 V and the energy density is smaller than that of the material of the layered structure, but it comprises Mn as a main component, has an advantage in terms of cost, and has the advantage that the safety of the battery can be easily enhanced due to high thermal stability during charge.

It is also considered that $LiNi_{0.5}Mn_{1.5}O_4$ having the same structure as $LiMn_2O_4$ and having high charge-discharge potential. Since discharge capacity is about 135 mAh/g and average discharge potential exhibits high of about 4.6V or more versus Li, the equivalent of $LiCoO_2$ and the like in terms of energy density can be obtained. Because of a spinel structure, the thermal stability during charging is as high as $LiMn_2O_4$. Further, as for a spinel structure such as $LiNi_{0.5}Mn_{1.5}O_4$, an energy density of 90% or more can be obtained even at a low temperature such as −20° C. Since the positive electrode active material of spinel structure has high ionic conductivity, it can be used over a wide range of temperature and charge-discharge rate. For these reasons, $LiNi_{0.5}Mn_{1.5}O_4$ is promising as a positive electrode material.

As a method of increasing the initial charging capacity of the lithium-manganese composite oxide having a spinel structure which has a smaller initial charge capacity than that of a positive electrode material having a layered structure such as $LiCoO_2$, a method of previously doping Li into the positive electrode active material is exemplified. Patent Document 1 discloses a technology for increasing the capacity of a battery by using $Li_{1+x}Mn_2O_4$ (X>0) obtained by doping Li into a lithium manganese composite oxide as a positive electrode active material and causing phase transition to $LiMn_2O_4$ during charge. Examples of the method of doping Li include a method of electrochemically doping Li as disclosed in Patent Document 2 and a method of obtaining by chemical reduction of $LiMn_2O_4$ as disclosed in Patent Document 3. Patent Documents 4 to 7 disclose examples of using a positive electrode active material comprising a tetragonal lithium-manganese composite oxide represented by $Li_{1+x}Mn_2O_4$ (X>0) or the like and a cubic lithium-manganese composite oxide represented by $LiMn_2O_4$ or the like, in order to suppress decrease in capacity by compensating for Li which is irreversibly taken into the negative electrode at the initial charge.

As another technique, there are some examples of techniques in which positive electrode active materials are mixed and used. For example, Patent Document 8 discloses a nonaqueous electrolyte secondary battery in which a lithium-manganese composite oxide represented by $LiMn_2O_4$ or the like is used as a positive electrode active material and a lithium-nickel composite oxide represented by $LiNi_{1-x}Co_xO_2$ (x is generally 0.1 to 0.4) or the like is mixed in the positive electrode. In such a mixture, the combination of positive electrode active materials is important. For example, $LiNi_{1-x}CoO_2$ has a disadvantage that its crystal structure is unstable in an overcharged state, but has an advantage that it has high capacity. On the other hand, $LiMn_2O_4$ has an advantage that safety during charging is high but the capacity is slightly small, and such disadvantages are compensated by the mixture. It is also shown that addition of $LiNi_{1-x}Co_xO_2$ as a hydrogen ion trapping agent reduces Mn elution and provides a high reliability.

Patent Document 9 discloses a positive electrode for lithium secondary batteries comprising a composite oxide having a spinel structure in which charge and discharge is performed at a high voltage of 4.5 V or more represented by $Li[M^1{}_mM^2{}_{2-m}]O_4$ such as $Li[Ni_{0.5}Mn_{1.5}]O_4$ and a composite oxide having a layered structure containing Mn such as $Li[Ni_{0.33}Li_{0.1}Mn_{0.57}]O_2$. By comprising a composite oxide having a spinel structure such as $LiNi_{0.5}Mn_{1.5}O_4$ which can be used at high charge-discharge rate and over a wide range of temperature, the disadvantage of a positive electrode active material having a layered structure containing Mn whose ion conductivity is low is compensated. Further, by using a composite oxide of a layered structure having a high energy density mixed with a composite oxide having a spinel structure such as $LiNi_{0.5}Mn_{1.5}O_4$, high energy density of a battery over a wide range of charge-discharge rates and temperatures is achieved.

As a negative electrode material, carbon materials are now mainly used. Meanwhile, negative electrode materials such as Si-based and Sn-based materials have been studied. Since these materials exhibit a large charge-discharge capacity as compared with carbon materials, higher energy density can be expected. However, there has been the problem that the charge-discharge efficiency at initial charge-discharge is low as compared with positive electrode active materials. For this reason, irreversible capacity is large at the initial charge-discharge, and most of Li in the positive electrode is consumed by irreversible capacity.

As for lithium ion batteries, although the above-mentioned materials are used for the positive electrode, there has been no positive electrode sufficiently satisfying rate and cycle characteristics while sufficiently compensating Li of an irreversible capacity of a negative electrode and exhibiting high discharge energy. In practical batteries, there are always requirements for rapid development of portable electronic devices and achieving higher energy for such as longer travel distance and smaller weight of loaded batteries of electric cars, and thus there has been a problem about increasing the capacity of the secondary battery.

CITATION LIST

Patent Document

Patent Document 1: Japanese Patent No. 3028582
Patent Document 2: Japanese Patent Laid-Open No. H9 (1997)-293512
Patent Document 3: Japanese Patent Laid-Open No. H10 (1998)-302766
Patent Document 4: Japanese Patent Laid-Open No. H9 (1997)-306475
Patent Document 5: Japanese Patent Laid-Open No. H10 (1998)-149828
Patent Document 6: Japanese Patent Laid-Open No. 2001-126731
Patent Document 7: Japanese Patent No. 5278994
Patent Document 8: Japanese Patent No. 2996234
Patent Document 9: Japanese Patent No. 4458232

SUMMARY OF INVENTION

Technical Problem

The present invention has been made in view of the above problems, and an object of the present invention is to provide a lithium secondary battery having a high capacity and improved charge-discharge cycle life.

Solution to Problem

The present embodiment relates to the following matters. A positive electrode comprising:
a Mn composite oxide having a tetragonal structure (active material (1)) represented by $$Li_a(M_xMn_{2-x-y}Y_y)(O_{4-w}Z_w) \qquad \text{formula (1)}$$

wherein in the formula (1), $1 < a \leq 2.6$, $0 \leq x \leq 1.2$, $0 \leq y$, $x+y<2$, $0 \leq w \leq 1$; M is at least one selected from the group consisting of Co, Ni, Fe, Cr and Cu; Y is at least one selected from the group consisting of Li, B, Na, Mg, Al, Ti, Si, K and Ca; Z is at least one of F or Cl; and
a composite oxide having a layered structure (active material (2)) represented by $$Li(Li_xM_{1-x-y}Y_y)O_2 \qquad \text{formula (2)}$$

wherein in the formula (2), $0 \leq x < 0.3$, $0 \leq y < 0.3$; M is at least one selected from the group consisting of Co, Fe, Ni and Mn; Y is at least one selected from the group consisting of Mg, Al, Zr, Ti and Zn.

Advantageous Effect of Invention

According to the present embodiment, it is possible to provide a lithium secondary battery having a high capacity and improved charge-discharge cycle life.

DESCRIPTION OF EMBODIMENTS

Figure 1:
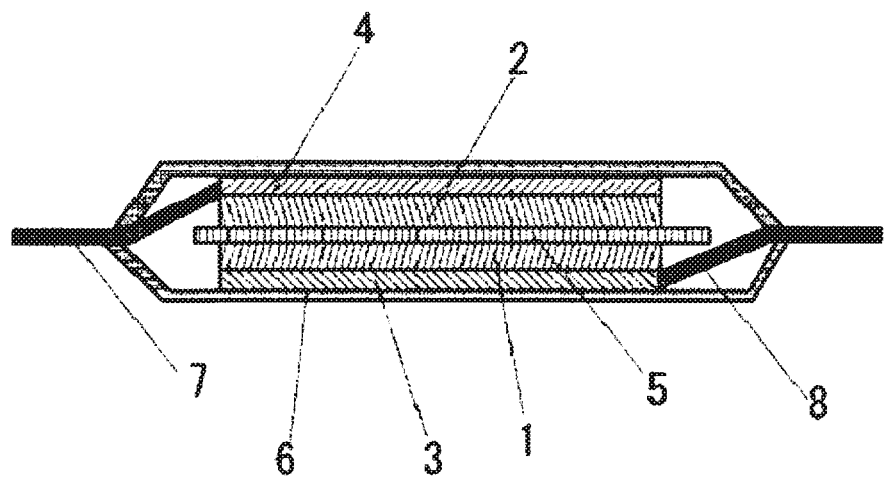
FIG. 1 is a sectional view according to one embodiment of a secondary battery using the positive electrode of the present invention.

Hereinafter, embodiments of the positive electrode of the present invention and the secondary battery using the positive electrode will be described for each component.

[Positive Electrode]

The positive electrode of the present embodiment comprises:
a Mn composite oxide having a tetragonal structure (active material (1)) represented by $$Li_a(M_xMn_{2-x-y}Y_y)(O_{4-w}Z_w) \qquad \text{formula (1)}$$

wherein in the formula (1), $1 < a \leq 2.6$, $0 \leq x \leq 1.2$, $0 \leq y$, $x+y<2$, $0 \leq w \leq 1$; M is at least one selected from the group consisting of Co, Ni, Fe, Cr and Cu; Y is at least one selected from the group consisting of Li, B, Na, Mg, Al, Ti, Si, K and Ca; Z is at least one of F or Cl; and
a composite oxide having a layered structure (active material (2)) represented by $$Li(Li_xM_{1-x-y}Y_y)O_2 \qquad \text{formula (2)}$$

wherein in the formula (2), $0 \leq x < 0.3$, $0 \leq y < 0.3$; M is at least one selected from the group consisting of Co, Fe, Ni and Mn; Y is at least one selected from the group consisting of Mg, Al, Zr, Ti and Zn.

In the secondary battery using a mixture of the Mn composite oxide having a tetragonal structure (active material (1)) and the composite oxide having a layered structure (the layered composite oxide) (active material (2)) as a positive electrode material, since the positive electrode active material initially holds much Li, Li that is consumed by irreversible capacity of the negative electrode is compensated and thereby the initial discharge capacity of the secondary battery can be improved. Further, by using a combination of the active material (1) which can operate at a high charge-discharge rate over a wide temperature range even after compensation for the irreversible capacity of the negative electrode and a high-capacity active material (2), the secondary battery which is excellent in cycle characteristics and rate characteristics and has high capacity can be obtained.

In the Mn composite oxide having a tetragonal structure represented by the formula (1), it is more preferable that x in the formula (1) is $0.4 \leq x \leq 1.2$. When a substitution amount of a transition metal element such as Co, Ni, Fe, Cr and Cu is $0.4 \leq x \leq 1.2$, a high operating potential of 4.5 V or more can be ensured.

As one embodiment, in the Mn composite oxide having a tetragonal structure represented by the formula (1), a in the formula (1) is preferably $1 < a \leq 2.2$, more preferably $1.05 \leq a \leq 2.0$. When the amount of Li is $1.05 \leq a \leq 2.0$, Li that is consumed by the irreversible capacity of the negative electrode can be efficiently compensated while maintaining good cycle characteristics. In the formula (1), a is more preferably $1.05 \leq a \leq 2.0$.

In one embodiment, the Mn composite oxide having a tetragonal structure represented by the formula (1), from the viewpoint of obtaining a sufficient capacity and achieving longer life, the Mn composite oxide represented by formula (3) is preferable:

$$Li_aNi_xMn_{2-x-y}A_yO_4 \qquad \text{formula (3)}$$

wherein in the formula (3), $1 < a \leq 2.6$, $0.4 < x < 0.6$, $0 \leq y < 0.3$, A is at least one selected from the group consisting of Li, B, Na, Mg, Al, Ti and Si. Among them, a in the formula (3) is preferably $1 < a \leq 2.2$. Furthermore, it is more preferable y in the formula (3) is $0 < y$. By setting to $0 < y$, chemical stability is excellent and a composition is substituted by these lighter metal than Mn, and thereby lighter weight is attained and an improvement of an energy density per weight is achieved. Furthermore, a in the formula (3) is further preferably $1.05 \leq a < 2.0$.

Examples of a method for manufacturing the Mn composite oxide having a tetragonal structure represented by the formula (1) include a method of adding lithium to a Mn composite compound having a spinel structure such as $Li(M_xMn_{2-x-y}Y_y)(O_{4-w}Z_w)$ (in the formula, the definitions of x, y, w, M, Y and Z are the same as those of the above formula (1)).

First, the Mn composite compound having a spinel structure may be synthesized as follows. As the material for producing the positive electrode active material, as for Li material, $Li_2CO_3$, LiOH, $Li_2O$, $Li_2SO_4$ and the like may be used, and among them, $Li_2CO_3$, LiOH and the like are particularly suitable. As Mn material, Mn oxides such as electrolytic manganese dioxide (EMD), $Mn_2O_3$, $Mn_3O_4$, CMD and the like may be used. As Ni material, NiO, $Ni(OH)_2$, $NiSO_4$, $Ni(NO_3)_2$ and the like may be used. As the materials for the substitution elements, oxides, carbonates, hydroxides, sulfides, nitrates and the like of the respective substitution elements are used.

These materials are weighed so that the objective metal composition ratio is obtained and are mixed. In the mixing, pulverizing and mixing are performed by a ball mill, a jet mill or the like. The mixed powder is calcined at a temperature of 400° C. to 1200° C. in air or in oxygen, to obtain a positive electrode active material. As to the calcining temperature, a high temperature is desirable in order to diffuse the respective elements, but if the calcining temperature is excessively high, oxygen deficiency occurs and there is an adverse effect on battery characteristics. From this reason, about 700° C. to 900° C. is desirable.

Next, lithium is added to the obtained Mn composite compound having a spinel structure. Some of the methods as a method for adding lithium may be considered. Example of the method includes mixing the obtained Mn composite compound having a spinel structure and the composite oxide having a layered structure of the formula (2) and applying the mixture on a current collector to be the state of an electrode, and then, immersing the electrode coated with the active material and a counter electrode using lithium and the like in the electrolyte solution and thereby electrochemically adding lithium. In this case, Li is doped only into the Mn composite compound having a spinel structure, but does not affect the composite oxide having a layered structure of formula (2). Here, when lithium is added, the magnitude of the current, application time and the like may be appropriately set depending on the type of the active material, the doping amount of Li and the like. For example, the current value is preferably 0.001 mA/g or more and 1 A/g or less based on the mass of the active material. When the current is excessively large, it is difficult to uniformly add lithium to the active material in the electrode. When the current is excessively small, it takes too much time to add lithium, which causes a practical problem. 0.01 mA/g or more and 100 mA/g or less is more preferable. As another method of adding lithium, the active material in a powder state of a spinel type crystal structure is mixed with lithium iodide and calcined under a reducing atmosphere. There are also other methods of adding lithium but the effects are the same even though the process is changed, and thus it is not limited to these methods. When lithium is added to the Mn composite compound having a spinel structure, open circuit voltage after the lithium addition is 2.5V or higher versus the lithium metal as far as the composition range is within the general formula (1). In a state of the electrode using such an active material, since it can exist stably in a state of low humidity, the subsequent work of producing a battery can be done without a special atmosphere control and the like.

The additive amount of Li in the active material (1), as described above, may be determined in consideration of the amount of Li consumed by the irreversible capacity of the negative electrode and the mixing ratio of the active material (1) and active material (2).

The positive electrode according to the present embodiment comprises at least the above active material (1) and the active material (2) before the first charge of the secondary battery.

In one embodiment, it is preferable to set the amount of Li such that the active material (1) undergoes a phase transition to cubic crystal by electrochemically releasing Li with charge and compensating for irreversible capacity of the negative electrode. Since the active material (1) undergoes phase transition to a cubic crystal, deterioration of the active material due to charge-discharge cycles is suppressed and thereby more preferable cycle characteristics can be obtained.

Further, in one embodiment, when the secondary battery is discharged, the positive electrode preferably contains the above-mentioned active material (1) and the active material (2). In such an embodiment, in a discharge state after a plurality of charge-discharge cycles (that is, after compensating for Li to the negative electrode), the Mn composite oxide having a tetragonal structure represented by the formula (1) may be detected. In such a secondary battery, irreversible capacity of the negative electrode is sufficiently compensated and it is expected that higher capacity is obtained. Here, the discharge state includes a state of the secondary battery discharged to a voltage lower than the actual use of the charge-discharge cycle (for example, down to the battery voltage of 2.5V or less).

In the composite oxide having a layered structure represented by formula (2), x in the formula (2) is 0<x<0.3 is more preferable.

Further, the composite oxide having a layered structure represented by the formula (2) (active material (2)) is, from the viewpoint of high energy density, a composite oxide represented by formula (4) is more preferable:

$$Li(Li_xM1_{1-x-x}Mn_Z)O_2 \quad \text{formula (4)}$$

wherein in the formula (4), $0 \leq x < 0.3$, $0.3 \leq z \leq 0.7$; M1 is at least one selected from the group consisting of Co, Ni and Fe.

In the composite oxide having a layered structure represented by the formula (4), a valence of M1 is changed during absorbing and desorbing lithium. Thus, when the amount of M1 is small, the capacity is reduced, and when it is large, the charge-discharge potential is decreased or the capacity is decreased conversely. Therefore, the composition range of M1 is more preferably more than 0.1 and 0.5 or less.

x in the formula (4) is further preferably $0<x<0.3$, and particularly preferably $0.05 \leq x$. $0.4 \leq z \leq 0.65$ is more preferable and $0.5 \leq z$ is further preferable.

The composite oxide having a layered structure represented by the formula (2) may also be produced in the same manner as the Mn composite compound having a spinel structure as described above.

The total content of the composite oxide having a layered structure represented by formula (2) in the positive electrode active material is preferably 2 to 70% by weight. When the total content is 2 to 70 wt %, it is possible to suppress decrease in rate characteristics due to decreased electrical conductivity of the active material and to suppress decrease in cycle characteristics. When the total content is 2 to 50% by weight, it is possible to further maintain the rate and cycle characteristics.

Among them, it is preferable to use the Mn composite oxide having a tetragonal structure represented by the formula (3) and the composite oxide having a layered structure represented by the formula (4) in a combination. The composite oxide having a layered structure represented by the formula (4) exhibits a large charge capacity of 300 mAh/g or more by setting the charge termination voltage to about 4.8 V. On the other hand, the charge termination voltage of the Mn composite oxide having a tetragonal structure represented by the formula (3) is also about 4.8 V to 4.85V, and it exhibits about 300 mAh/g of charge capacity at maximum depending on the amount of lithium added. In this manner, since the charge termination voltages are close, it is possible to hardly cause the capacity reduction of the composite oxide having a layered structure represented by the formula (4) due to instability of the crystal structure during charge, while both are sufficiently exhibiting capacities. Further, as described above, since both of the positive electrode materials initially hold much of Li, they can sufficiently compensate for Li which is the irreversible capacity of the negative electrode. In particular, when a negative electrode with large irreversible capacity such as Si and SiO are used, the effect of energy density is significantly improved. It is found that the case where the composite oxide having a layered structure represented by the formula (4) and the Mn composite oxide having a tetragonal structure represented by the formula (3) are mixed and used as a positive material is more excellent in cycle characteristics than the case where each positive material is used singly.

As the composite oxide having a layered structure represented by the above formula (2), the compound containing Mn and Ni as M in formula (2) such as $LiNi_{0.5}Mn_{0.3}Co_{0.2}O_2$ (abbreviated as NMC532), $LiNi_{0.4}Mn_{0.3}Co_{0.3}O_2$ (abbreviated as NMC433) and $LiNi_{0.8}Co_{0.1}Mn_{0.1}O_2$ (abbreviated as NMC811) and the compound wherein a part of the transition metals (Ni, Mn and/or Co) is substituted by Li in these compounds may be used.

Incidentally, as a positive active material, the other active materials may be used in addition to the Mn composite oxide having a tetragonal structure represented by the formula (1) (active material (1)) and the composite oxide having a layered structure represented by the formula (2) (active material (2) as long as the effect of the present invention can be obtained. Examples of the other active materials, olivine-type materials represented by $LiMPO_4$ (wherein M is at least one selected from the group consisting of Fe, Co, and Ni), Si-containing composite oxides represented by $Li_xMSiO_4$ ($0 \leq x \leq 2$, M is at least one selected from Mn, Fe and Co) and the like. When other active materials are used in combination, the total content of the active material (1) and the active material (2) to the total positive active material is generally 50% by weight or more, preferably 70% by weight or more, more preferably 80% by weight or more and further preferably more than 90% by weight. Among them, it is preferable that the content of the Mn composite oxide having a tetragonal structure represented by the formula (1) is 50% by weight or more. Further, according to the type and content of the other active materials, it is also preferable to adjust the Li content of the compound represented by the formula (1).

The positive electrode may be produced, for example, by applying to an electrode current collector a positive electrode slurry which is prepared by mixing a positive electrode active material, a positive electrode binder and if necessary, a conductive assisting agent. Examples of the conductive assisting agent include carbon materials such as acetylene black, carbon black, fibrous carbon and graphite, metallic material such as Al, powders of electrically conductive oxides and the like. Examples of the positive electrode binder include polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide and the like.

The positive electrode may have a structure in which a positive electrode active material layer containing a positive electrode active material is formed on a current collector. The positive electrode of the present embodiment has, for example, a positive electrode current collector formed of a metal foil and a positive electrode active material layer applied to one surface or both surfaces of the positive electrode current collector. The positive electrode active material layer is formed so as to cover the positive electrode current collector by a positive electrode binder. The positive electrode current collector is arranged to have an extended portion connected to a positive electrode terminal, and the positive electrode active material layer is not applied to this extended portion.

The content of the conductive assisting agent in the positive electrode may be, for example, 1 to 10% by mass in a positive active material layer. The content of the binder in the positive electrode may be, for example, 1 to 10% by mass in a positive active material layer. When the content is within the range, the ratio of the amount of the active material in the electrode is easily ensured sufficiently and enough capacity per unit mass is easily obtained.

The positive electrode current collector is not particularly limited, but from the electrochemical stability, examples thereof include aluminum, nickel, copper, silver and alloys thereof are preferable. The shape of the positive electrode current collector includes foil, flat plate and mesh.

[Negative Electrode]

The negative electrode may have a structure in which a negative electrode active material layer containing a negative electrode active material is formed on a current collector. The negative electrode of the present embodiment has, for example, a negative electrode current collector formed of a metal foil and a negative electrode active material layer applied to one surface or both surfaces of the negative electrode current collector. The negative electrode active material layer is formed so as to cover the negative electrode current collector by a negative electrode binder. The negative electrode current collector is arranged to have an extended portion connected to a negative electrode terminal, and the negative electrode active material layer is not applied to this extended portion.

The negative electrode active materials are not particularly limited as long as they can absorb and desorb lithium ions, and known materials may be used. Specific examples of the negative electrode active material include carbon materials such as graphite (natural graphite, artificial graphite and the like), coke, and hard carbon, lithium alloys such as lithium-aluminum alloys, lithium-lead alloys, and lithium-tin alloys, lithium metal, Si, and metal oxides having a potential less noble than that of the positive electrode active material, such as $SnO_2$, SnO, $TiO_2$, SiO and $Li_4Ti_5O_2$. These may be used singly or in combination of two or more.

Among them, when a negative electrode active material including Li metal, a metal or forming an alloy with Li such as Si, Sn, Al and the like, and a metal oxide capable of absorbing and desorbing lithium ions such as Si oxide ($SiO_x$ ($0<x\leq2$)), Si composite oxide containing Si and other metal elements than Si (e.g., Li, B, Mg, Na, Al, K, Ca, Ti, V, Cr, Mn, Fe, Co, Ni, Cu, Zn and the like), Sn oxide, Sn composite oxide containing Sn and other metal elements than Sn and the positive electrode according to the present invention are used in combination, the effect of higher energy density can be obtained. These negative electrode active materials may form a composite with a carbon material. It may be coated with a carbon material. The content of these negative electrode active materials in the negative electrode active material are not particularly limited, but from the viewpoint of high energy density, is generally 5% by weight or more, preferably 10% by weight or more, more preferably 20% by weight or more, further preferably 40% by weight or more.

The negative electrode may be produced, for example, by applying to an electrode current collector a negative electrode slurry which is prepared by mixing a negative electrode active material, a negative electrode binder, and if necessary, a conductive assisting agent. Examples of the conductive assisting agent include a carbon material and powder of an electrically conductive oxide. As the negative electrode binder, it is not particularly limited but, for example, polyvinylidene fluoride, vinylidene fluoride-hexafluoropropylene copolymer, vinylidene fluoride-tetrafluoroethylene copolymer, styrene-butadiene copolymer rubber (SBR), polytetrafluoroethylene, polypropylene, polyethylene, polyimide, polyamide-imide, polyacrylic acid and the like may be used. Among these, polyimide or polyamide-imide is preferable because binding properties thereof are strong. When the styrene-butadiene copolymer rubber (SBR) which is a water-dispersible binder is used, carboxymethyl cellulose (CMC) as a thickener may be used in combination.

The amount of the negative electrode binder used is preferably from 5 to 25 parts by mass based on 100 parts by mass of the negative electrode active material from the viewpoint of a trade-off relationship between "a sufficient binding power" and "an increase in energy".

Examples of the negative electrode current collector preferably include aluminum, nickel, stainless, chromium, copper, silver, and alloys thereof from the viewpoint of electrochemical stability. Examples of the shape include foil, plate, and mesh shapes.

Examples of the method for forming a negative electrode active material layer include doctor blade methods, die coater methods, CVD methods, and sputtering methods. After a negative electrode active material layer is formed in advance, a thin film of aluminum, nickel, or alloys thereof may be formed by a method such as vapor deposition and sputtering to provide a negative electrode.

[Separator]

The separator is not particularly limited, and known materials may be used. Examples of the separator that may be used specifically include polyolefin-based microporous films such as polyethylene and polypropylene, and those containing cellulose or glass fiber.

[Electrolyte Solution]

As the electrolyte solution in the present invention, the electrolyte solution obtained by dissolving a lithium salt as an electrolyte in a solvent may be used. Examples of the solvent include aprotic organic solvents including cyclic carbonates such as propylene carbonate (PC), ethylene carbonate (EC), butylene carbonate (BC), vinylene carbonate (VC) and monofluoroethylene carbonate (FEC), chain carbonates such as dimethyl carbonate (DMC), diethyl carbonate (DEC), ethyl methyl carbonate (EMC) and dipropyl carbonate (DPC), aliphatic carboxylic acid esters such as methyl formate, methyl acetate and ethyl propionate, 7-lactones such as 7-butyrolactone, chain ethers such as 1,2-ethoxyethane (DEE) and ethoxy methoxy ethane (EME), cyclic ethers such as tetrahydrofuran and 2-methyltetrahydrofuran, dimethylsulfoxide, 1,3-dioxolane, formamide, acetamide, dimethyl formamide, dioxolane, acetonitrile, propyl nitrile, nitromethane, ethyl monoglyme, phosphoric acid triester, trimethoxy methane, dioxolane derivatives, cyclic or chain sulfones such as sulfolane, methyl sulfolane, dimethyl sulfone, ethyl methyl sulfone, 1,3-dimethyl-2-imidazolidinone, 3-methyl-2-oxazolidinone, propylene carbonate derivatives, tetrahydrofuran derivatives, ethyl ether, 1,3-propane sultone, anisole, N-methylpyrrolidone, fluorinated carboxylic acid ester, fluorinated ether and fluorinated phosphate ester. These may be used alone or as a mixture of two or more.

A lithium salt is dissolved in these organic solvents. Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, lithium lower aliphatic carboxylate, chloroborane lithium, lithium tetraphenylborate, LiBr, LiI, LiSCN, LiCl and imides. It is also possible to use a polymer electrolyte in place of the electrolyte solution. The concentration of the electrolyte is, for example, from 0.5 mol/l to 1.5 mol/l. If the concentration is excessively high, density and viscosity increase. If the concentration is excessively low, electrical conductivity may be decreased

[Outer Package]

The outer package may be appropriately selected as long as it is stable to the electrolyte solution and has sufficient water vapor barrier properties. For example, in the case of a layer laminate secondary battery, examples of the outer package that can be used include laminate films, such as polypropylene and polyethylene on which aluminum or silica is coated.

[Secondary Battery]

The secondary battery may have a configuration in which a positive electrode having a positive electrode active material, a negative electrode having a negative electrode active material, a separator sandwiched between the positive electrode and the negative electrode as an insulator, and an electrolyte solution having lithium-ion conductivity are sealed in an outer package. Application of an electric voltage across the positive electrode and negative electrode allows the positive electrode active material to desorb lithium ions and the negative electrode active material to absorb the lithium ions, and thus, the battery will be in a charged state. A discharged state is a state opposite to the charged state.

Examples of the shape of the battery include cylindrical, rectangular, coin, button, and laminate shapes. Examples of the battery outer package include stainless, iron, aluminum, titanium, or alloys thereof, or plated products thereof. An example of the plating that may be used includes nickel plating.

The secondary battery may be produced, for example, by housing a layered body of a negative electrode and a positive electrode with a separator interposed therebetween, or the one obtained by winding the layered body in an outer package such as a can case under a dried air or inert gas atmosphere, and then pouring an electrolyte solution into the outer package, and then sealing it with a flexible film or the like made of a laminate of synthetic resin and metal foils or the like.

The configuration of the secondary battery is not particularly limited, for example, the battery can be a configuration of a winding type in which a positive electrode and a negative electrode which are disposed on opposite sides of a separator are wound, or a lamination type in which these are laminated.

Figure 2:
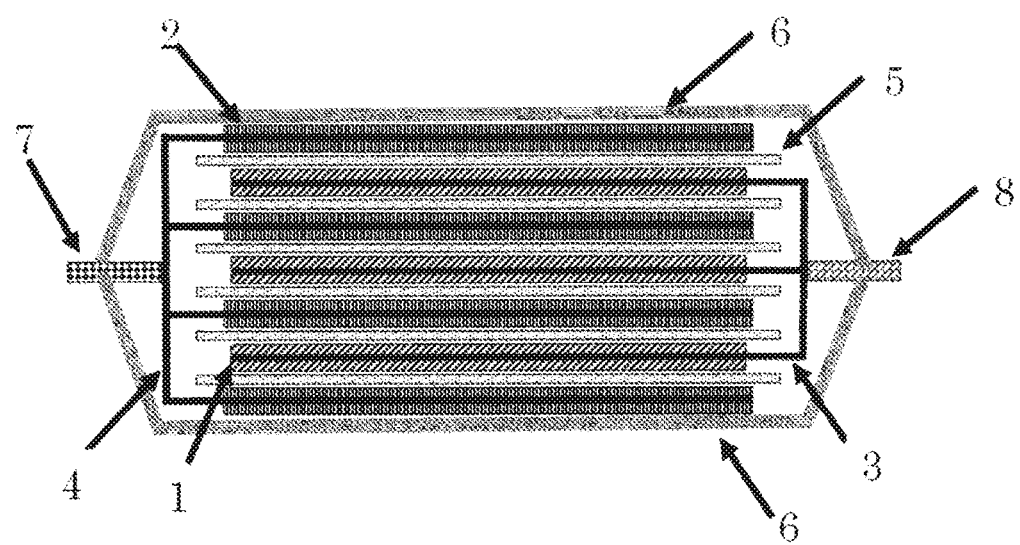
FIG. 2 is a schematic sectional view showing the structure of a laminate type secondary battery according to one embodiment of the present invention.

FIG. 1 shows a laminate-type secondary battery as an example of the secondary battery according to the present embodiment. A separator 5 is interposed between a positive electrode which is composed of a positive electrode active material layer 1 comprising a positive electrode active material and a positive electrode current collector 3, and a negative electrode which is composed of a negative electrode active material layer 2 and a negative electrode current collector 4. The positive electrode current collector 3 is connected with a positive electrode lead terminal 8, and the negative electrode current collector 4 is connected with a negative electrode lead terminal 7. An outer package laminate 6 is used for the outer package, and the inside of the secondary battery is filled with an electrolyte solution. As shown in FIG. 2, it is preferable that the electrode element (also referred to as "battery element" or "electrode laminate") may have an arrangement in which a plurality of positive electrodes and a plurality of negative electrodes are stacked via separators.

Examples of the laminate resin film used in laminate types include aluminum, aluminum alloy, and titanium foil. Examples of the material for the heat-welding portions of the metal laminate resin film include thermoplastic polymer materials such as polyethylene, polypropylene, and polyethylene terephthalate. Each metal laminate resin layer and metal foil layer is not limited to one layer, and they may be two or more layers.

Figure 3:
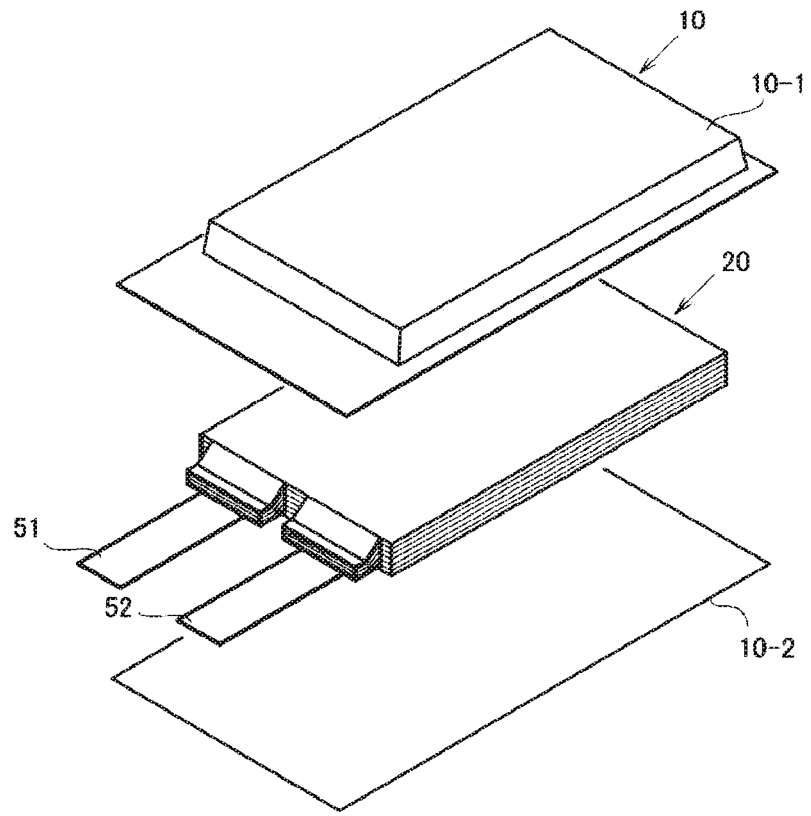
FIG. 3 is a perspective sectional view showing a basic structure of a film outer package battery.
Figure 4:
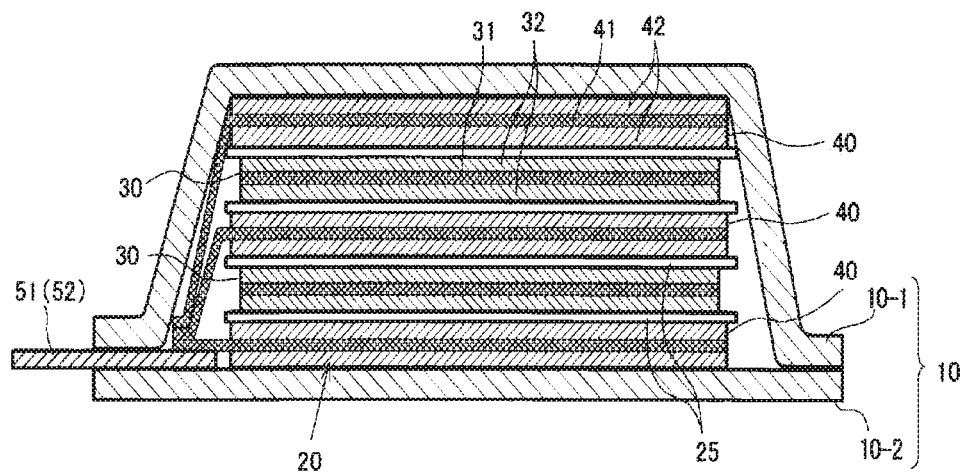
FIG. 4 is a schematic sectional view of the battery shown in FIG. 3.

As another embodiment, a secondary battery having a structure as shown in FIG. 3 and FIG. 4 may be provided. This secondary battery comprises a battery element 20, a film outer package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the outer package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film outer package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

A plurality of secondary batteries according to the present invention may be combined to form an assembled battery.

The secondary battery and the assembled battery as described herein can also be suitably used for a motor driving power source used for an electric vehicle such as an automobile; a household power storage system, a power storage device used for solar power generation or wind power generation and the like.

EXAMPLE

Hereinbelow, examples of the present embodiment will be described in details, but the present embodiment is not intended to be limited to the following examples.

Example 1

A laminate type lithium ion secondary battery having the structure shown in FIG. 1 was produced.

(Production of a Positive Electrode)

The materials of $MnO_2$, NiO, $Li_2CO_3$ and $TiO_2$ were weighed so as to form $LiMn_{1.4}Ni_{0.5}Ti_{0.1}O_4$ which is the composition of the spinel structure of the active material (1) before adding Li, and were pulverized and mixed. Subsequently, the mixed powder was calcined at 850° C. for 8 hours. This positive electrode active material was confirmed to have a substantially single-phase of spinel structure. Likewise, for the active material (2), materials of $MnO_2$, NiO and $Li_2CO_3$ were weighed so as to be the intended metal composition ratio, and were pulverized and mixed, and the mixed powder was calcined at 850° C. for 8 hours. This positive electrode active material was confirmed to have a substantially single-phase of layered structure.

The prepared active material having a spinel structure and the active material (2) were mixed at a mixing ratio of 98/2 (weight ratio) to prepare a positive electrode active material before adding Li.

The prepared positive electrode active material and a carbon black which is an electric conductive assisting agent were mixed, and the mixture was dispersed in a solution in which polyvinylidene fluoride (PVDF) as a binder was dissolved in N-methylpyrrolidone and serves to prepare a positive electrode slurry. The mass ratio of the positive electrode active material, the electric conductive assisting agent, and the positive electrode binder was 91/5/4. The positive electrode slurry was uniformly applied on the both sides of a current collector made of Al. Subsequently, the resultant was dried in vacuum for 12 hours and was subjected to a compression-molding by a roll press to produce a positive electrode.

(Conditions for Adding Lithium to the Positive Electrode)

Electrode tabs were connected to the obtained electrode and lithium metal respectively and placed so as not to come into electrical contact in the beaker. The beaker was filled with an electrolyte solution in which ethylene carbonate (EC) and dimethyl carbonate (DMC) as an electrolyte solvent in a volume ratio of 3/7 and $LiPF_6$ as an electrolyte supporting salt was dissolved so as to be a concentration of 1 mol/l. The electrode tab was put outside the electrolyte solution, and current was passed between the electrode tabs so that lithium was absorbed into the positive electrode. The current was set to 10 mA/g per mass of the positive electrode active material present in the beaker. Li doping was performed by setting the application time of the current so that the composition ratio of the amount of Li after doping became 1.5. It was confirmed by X-ray diffraction of the obtained electrode that the positive electrode active material (1) had a tetragonal crystal structure. For the positive electrode, the thickness of the electrode was adjusted so that the initial charge capacity was 5.5 mAh/cm². The density of the positive electrode was adjusted to be 2.7 g/cc.

(Production of a Negative Electrode)

SiO was used as a negative electrode active material. This negative electrode active material and polyamide imide (manufactured by Toyobo Co., Ltd., trade name: Vylomax (registered trademark)) as a negative electrode binder were weighed at a mass ratio of 85:15, and they mixed with N-methylpyrrolidone to prepare a negative electrode slurry. The negative electrode slurry was applied to a copper foil having a thickness of 10 μm and dried thereafter, and further subjected to a heat treatment at 300° C. in a nitrogen atmosphere, to prepare a negative electrode.

(Non-Aqueous Electrolyte Solution)

As the electrolyte solution, a mixture of ethylene carbonate (EC) and diethyl carbonate (DMC) at 30:70 (vol. %) was used as an electrolyte solvent, and $LiPF_6$ was used as an electrolyte solution supporting salt, and the concentration of the supporting salt was 1 mol/l.

(Production of a Laminate-Type Battery)

The above-described positive electrode and the negative electrode were cut into 3 cm×3 cm. The obtained positive electrode and the negative electrode are laminated with polypropylene porous films interposed inbetween as a separator. The ends of the positive electrode current collector not covered with the positive electrode active material and the ends of the negative electrode current collector not covered with the negative electrode active material were each welded, and a positive electrode terminal made of aluminum and a negative electrode terminal made of nickel were welded to the welded parts to thereby obtain an electrode element having a flat laminate structure. The electrode element described above was enclosed with an aluminum laminate film that serves as an outer package, then the internal of outer package was poured with the electrolyte solution, and then the outer package was sealed under reduced pressure to produce a secondary battery.

(Conditions for Evaluating Charge and Discharge Characteristics)

To the battery fabricated as described above, after charging to 4.75 V at 0.1 C, constant voltage charge was performed for a total of 10 hours, and then constant current discharge to 2.0 V at 0.1 C was conducted. The value of the initial discharge capacity and the proportion of the discharge capacity after 50 cycles to the initial discharge capacity as the capacity retention ratio when the cycle was repeated 50 times at 20° C. were determined. The results are shown in Table 1.

Examples 2-8, Comparative Examples 1-2

Batteries were fabricated and measured in the same manner as in Example 1 except that the mixing ratio of the positive electrode active materials before adding Li were changed to the weight ratios shown in Table 1.

Table 1 shows mixing ratios of the positive electrode active materials, the initial discharge capacities and the capacity retention ratios after 50 cycles at 20° C. of Examples 1 to 8 and Comparative Examples 1 and 2.

TABLE 1

| | mixing ratio of positive electrode active materials | | initial discharge capacity [mAh/g] (per positive electrode active material) | capacity retention ratio after 50 cycles [%] |
|---|---|---|---|---|
| | Active material (1) $Li_{1.5}Mn_{1.4}Ni_{0.5}Ti_{0.1}O_4$ | Active material (2) $Li[Li_{0.15}Ni_{0.28}Mn_{0.57}]O_2$ | | |
| Com-Ex. 1 | 100% | 0% | 129.8 | 73.0 |
| Com-Ex. 2 | 0% | 100% | 188.8 | 35.8 |
| Ex. 1 | 98% | 2% | 131.5 | 83.5 |
| Ex. 2 | 95% | 5% | 135.0 | 89.5 |
| Ex. 3 | 90% | 10% | 138.2 | 92.6 |
| Ex. 4 | 80% | 20% | 145.7 | 89.8 |
| Ex. 5 | 70% | 30% | 150.5 | 87.6 |
| Ex. 6 | 60% | 40% | 153.2 | 83.7 |
| Ex. 7 | 50% | 50% | 156.5 | 79.5 |
| Ex. 8 | 30% | 70% | 167.5 | 75.5 |

Com-Ex.: Comparative Example
Ex.: Example

The lithium secondary batteries of Examples 1 to 8 comprise the positive electrodes containing the Mn composite oxide having a tetragonal structure (active material (1)) and the composite oxide having a layered structure (active material (2)). As shown in Comparative Examples 1 and 2, in a lithium secondary battery including a positive electrode containing only either one of the active material (1) and the active material (2), both of the discharge capacity and the capacity retention ratio were not satisfied. On the other hand, as shown in Examples 1 to 8, it was found that the lithium secondary battery fabricated using the positive electrode containing both of the active material (1) and the active material (2) exhibits high initial discharge capacity while maintaining excellent cycle characteristics. For example, in the case of Example 4, it is considered that the positive electrode active material comprises the composition of $Li_{1\ to\ 1.5}Ni_{0.5}Mn_{1.4}Ti_{0.1}O_4$ (active material (1)) and $Li_{0.7\ to\ 1}(Li_{0.15}Ni_{0.28}Mn_{0.57})O_2$ (active material (2)) during discharge (about 2V) in a full cell. As described above, in the lithium secondary battery of the present embodiment, it is considered that the positive electrode active material maintains a composition exhibiting excellent battery characteristics even after compensating for irreversible capacity of the negative electrode.

Examples 9-17, Comparative Example 3

A battery was fabricated in the same manner as in Example 4 except that the positive electrode in which Li doping amount in the active material (1) of Example 4 was changed to the composition shown in Table 2 was used.

Examples 18-21

A battery was fabricated in the same manner as in Example 4 except that the positive electrode in which the active material (2) of Example 4 was changed to the composition shown in Table 2 was used.

Examples 22-27

A battery was fabricated in the same manner as in Example 4 except that the positive electrode in which the active material (1) of Example 4 was changed to the composition shown in Table 2 was used.

TABLE 2

| | Positive electrode active material | | initial discharge capacity [mAh/g] per positive electrode active material | capacity retention ratio after 50 cycles [%] |
|---|---|---|---|---|
| | Active material (1) (mixing ratio: 80%) | Active material (2) (mixing ratio: 20%) | | |
| Com-Ex. 3 | $LiMn_{1.4}Ni_{0.5}Ti_{0.1}O_4$ | $Li[Li_{0.15}Ni_{0.28}Mn_{0.57}]O_2$ | 90.8 | 87.5 |
| Ex. 9 | $Li_{1.1}Mn_{1.4}Ni_{0.5}Ti_{0.1}O_4$ | $Li[Li_{0.15}Ni_{0.28}Mn_{0.57}]O_2$ | 104.8 | 88.2 |
| Ex. 10 | $Li_{1.2}Mn_{1.4}Ni_{0.5}Ti_{0.1}O_4$ | $Li[Li_{0.15}Ni_{0.28}Mn_{0.57}]O_2$ | 115.5 | 87.9 |
| Ex. 11 | $Li_{1.3}Mn_{1.4}Ni_{0.5}Ti_{0.1}O_4$ | $Li[Li_{0.15}Ni_{0.28}Mn_{0.57}]O_2$ | 124.9 | 89.5 |
| Ex. 12 | $Li_{1.4}Mn_{1.4}Ni_{0.5}Ti_{0.1}O_4$ | $Li[Li_{0.15}Ni_{0.28}Mn_{0.57}]O_2$ | 136.2 | 90.0 |
| Ex. 13 | $Li_{1.5}Mn_{1.4}Ni_{0.5}Ti_{0.1}O_4$ | $Li[Li_{0.15}Ni_{0.28}Mn_{0.57}]O_2$ | 145.7 | 89.8 |
| Ex. 14 | $Li_{1.6}Mn_{1.4}Ni_{0.5}Ti_{0.1}O_4$ | $Li[Li_{0.15}Ni_{0.28}Mn_{0.57}]O_2$ | 146.7 | 90.4 |
| Ex. 15 | $Li_{1.8}Mn_{1.4}Ni_{0.5}Ti_{0.1}O_4$ | $Li[Li_{0.15}Ni_{0.28}Mn_{0.57}]O_2$ | 145.8 | 92.1 |
| Ex. 16 | $Li_{2.0}Mn_{1.4}Ni_{0.5}Ti_{0.1}O_4$ | $Li[Li_{0.15}Ni_{0.28}Mn_{0.57}]O_2$ | 146.0 | 89.2 |
| Ex. 17 | $Li_{2.6}Mn_{1.4}Ni_{0.5}Ti_{0.1}O_4$ | $Li[Li_{0.15}Ni_{0.28}Mn_{0.57}]O_2$ | 144.5 | 88.7 |
| Ex. 18 | $Li_{1.5}Mn_{1.4}Ni_{0.5}Ti_{0.1}O_4$ | $Li[Li_{0.2}Ni_{0.2}Mn_{0.6}]O_2$ | 143.2 | 88.7 |
| Ex. 19 | $Li_{1.5}Mn_{1.4}Ni_{0.5}Ti_{0.1}O_4$ | $Li[Li_{0.2}Ni_{0.16}Co_{0.08}Mn_{0.56}]O_2$ | 144.8 | 90.1 |
| Ex. 20 | $Li_{1.5}Mn_{1.4}Ni_{0.5}Ti_{0.1}O_4$ | $Li[Li_{0.1}Ni_{0.33}Mn_{0.57}]O_2$ | 142.1 | 89.3 |
| Ex. 21 | $Li_{1.5}Mn_{1.4}Ni_{0.5}Ti_{0.1}O_4$ | $Li[Li_{0.23}Ni_{0.15}Fe_{0.15}Mn_{0.47}]O_2$ | 145.8 | 85.2 |
| Ex. 22 | $Li_{1.5}Ni_{0.5}Mn_{1.3}Ti_{0.2}O_4$ | $Li[Li_{0.15}Ni_{0.28}Mn_{0.57}]O_2$ | 144.9 | 90.3 |
| Ex. 23 | $Li_{1.5}Ni_{0.5}Mn_{1.3}Ti_{0.15}Fe_{0.05}O_4$ | $Li[Li_{0.15}Ni_{0.28}Mn_{0.57}]O_2$ | 143.8 | 88.9 |
| Ex. 24 | $Li_{1.5}Ni_{0.5}Mn_{1.45}Li_{0.05}O_4$ | $Li[Li_{0.15}Ni_{0.28}Mn_{0.57}]O_2$ | 145.2 | 88.3 |
| Ex. 25 | $Li_{1.5}Ni_{0.5}Mn_{1.45}Al_{0.05}O_{3.95}F_{0.05}$ | $Li[Li_{0.15}Ni_{0.28}Mn_{0.57}]O_2$ | 146.1 | 87.9 |
| Ex. 26 | $Li_{1.5}Ni_{0.5}Mn_{1.5}O_4$ | $Li[Li_{0.15}Ni_{0.28}Mn_{0.57}]O_2$ | 147.3 | 87.2 |
| Ex. 27 | $Li_{1.5}Ni_{0.25}Fe_{0.25}Mn_{1.5}O_4$ | $Li[Li_{0.15}Ni_{0.28}Mn_{0.57}]O_2$ | 145.8 | 87.0 |

Com-Ex.: Comparative Example
Ex.: Example

As shown in Table 2, it was found that even when the composition and the Li doping amount of the active material (1) and the composition of the active material (2) are changed, excellent cycle characteristics are exhibited while maintaining a high initial discharge capacity.

Examples 28 to 43

Table 3 shows Examples in which graphite, amorphous carbon, SiO or a mixture of SiO and graphite was used as the active material for the negative electrode.

TABLE 3

| | Positive electrode active material | | Negative electrode active material | initial discharge capacity [mAh/g] per positive electrode active material | capacity retention ratio after 50 cycle [%] |
|---|---|---|---|---|---|
| | Active material (1) (mixing ratio: 80%) | Active material (2) (mixing ratio: 20%) | | | |
| Ex. 28 | $Li_{1.05}Mn_{1.4}Ni_{0.5}Ti_{0.1}O_4$ | $Li[Li_{0.15}Ni_{0.28}Mn_{0.57}]O_2$ | graphite | 147.1 | 91.2 |
| Ex. 29 | $Li_{1.1}Mn_{1.4}Ni_{0.5}Ti_{0.1}O_4$ | $Li[Li_{0.15}Ni_{0.28}Mn_{0.57}]O_2$ | | 154.3 | 90.6 |
| Ex. 30 | $Li_{1.2}Mn_{1.4}Ni_{0.5}Ti_{0.1}O_4$ | $Li[Li_{0.15}Ni_{0.28}Mn_{0.57}]O_2$ | | 145.5 | 89.7 |
| Ex. 31 | $Li_{1.05}Mn_{1.4}Ni_{0.5}Ti_{0.1}O_4$ | $Li[Li_{0.15}Ni_{0.28}Mn_{0.57}]O_2$ | amor- | 137.3 | 92.5 |
| Ex. 32 | $Li_{1.1}Mn_{1.4}Ni_{0.5}Ti_{0.1}O_4$ | $Li[Li_{0.15}Ni_{0.28}Mn_{0.57}]O_2$ | phous | 141.4 | 91.6 |
| Ex. 33 | $Li_{1.2}Mn_{1.4}Ni_{0.5}Ti_{0.1}O_4$ | $Li[Li_{0.15}Ni_{0.28}Mn_{0.57}]O_2$ | carbon | 145.7 | 92.2 |
| Ex. 34 | $Li_{1.3}Mn_{1.4}Ni_{0.5}Ti_{0.1}O_4$ | $Li[Li_{0.15}Ni_{0.28}Mn_{0.57}]O_2$ | | 145.4 | 90.3 |
| Ex. 35 | $Li_{1.05}Mn_{1.4}Ni_{0.5}Ti_{0.1}O_4$ | $Li[Li_{0.15}Ni_{0.28}Mn_{0.57}]O_2$ | SiO (10%) | 139.1 | 90.1 |
| Ex. 36 | $Li_{1.1}Mn_{1.4}Ni_{0.5}Ti_{0.1}O_4$ | $Li[Li_{0.15}Ni_{0.28}Mn_{0.57}]O_2$ | + | 143.2 | 89.2 |
| Ex. 37 | $Li_{1.2}Mn_{1.4}Ni_{0.5}Ti_{0.1}O_4$ | $Li[Li_{0.15}Ni_{0.28}Mn_{0.57}]O_2$ | graphite | 145.7 | 88.9 |
| Ex. 38 | $Li_{1.3}Mn_{1.4}Ni_{0.5}Ti_{0.1}O_4$ | $Li[Li_{0.15}Ni_{0.28}Mn_{0.57}]O_2$ | (90%) | 145.4 | 89.3 |
| Ex. 39 | $Li_{1.1}Mn_{1.4}Ni_{0.5}Ti_{0.1}O_4$ | $Li[Li_{0.15}Ni_{0.28}Mn_{0.57}]O_2$ | SiO (30%) | 132.2 | 88.5 |
| Ex. 40 | $Li_{1.2}Mn_{1.4}Ni_{0.5}Ti_{0.1}O_4$ | $Li[Li_{0.15}Ni_{0.28}Mn_{0.57}]O_2$ | + | 140.0 | 89.3 |
| Ex. 41 | $Li_{1.3}Mn_{1.4}Ni_{0.5}Ti_{0.1}O_4$ | $Li[Li_{0.15}Ni_{0.28}Mn_{0.57}]O_2$ | graphite | 147.5 | 88.7 |
| Ex. 42 | $Li_{1.4}Mn_{1.4}Ni_{0.5}Ti_{0.1}O_4$ | $Li[Li_{0.15}Ni_{0.28}Mn_{0.57}]O_2$ | (70%) | 146.9 | 87.8 |
| Ex. 43 | $Li_{1.5}Mn_{1.4}Ni_{0.5}Ti_{0.1}O_4$ | $Li[Li_{0.15}Ni_{0.28}Mn_{0.57}]O_2$ | SiO | 145.7 | 89.8 |

Ex.: Example

Depending on the initial irreversible capacity ratio of the negative electrode active material, a suitable Li doping amount (or the composition ratio of the active material (1):the active material (2)) differs. By adjusting these, even when a negative electrode active material of which initial irreversible capacity is large is used, it is possible to minimize the decrease in the initial discharge capacity and improve the energy density of the battery. As shown in Table 3, it was found that excellent cycle characteristics are exhibited while maintaining a high initial discharge capacity even when the type of negative electrode active material is changed.

As shown above, by employing the constitution of the present embodiment, it is possible to obtain a lithium secondary battery exhibiting excellent cycle characteristics while having a high initial discharge capacity.

This application claims priority based on Japanese Patent Application No. 2014-161123, filed on Aug. 7, 2014, the disclosure of which is incorporated herein by reference in its entirety.

INDUSTRIAL APPLICABILITY

The present embodiment can be utilized in various industrial fields that require for a power supply and in an industrial field concerning transportation, storage and supply of electric energy. Specifically, it can be utilized for, for example, a power supply of a mobile device such as a mobile phone and a notebook computer; a power supply of a moving or transport medium such as a train, a satellite and a submarine, including an electric vehicle such as an electric car, a hybrid car, an electric motorcycle, and an electric power-assisted bicycle; a back-up power supply such as UPS; and a power storage device for storing an electric power generated by solar power generation, wind power generation, and the like.

EXPLANATION OF REFERENCE 1 positive electrode active material layer
2 negative electrode active material layer
3 positive electrode current collector
4 negative electrode current collector
5 separator
6 outer package laminate
7 negative electrode lead terminal
8 positive electrode lead terminal
10 film outer package
20 battery element
25 separator
30 positive electrode
40 negative electrode

The invention claimed is:
1. A positive electrode comprising:
a Mn composite oxide having a tetragonal structure (active material (3)) represented by the following formula (3):

$$Li_aNi_xMn_{2-x-y}A_yO_4 \quad \text{formula (3)}$$

wherein in the formula (3), $1<a\leq2.6$, $0.4<x<0.6$, $0<y<0.3$, A is at least one selected from the group consisting of B, Na, Mg, Al, Ti and Si; and
a composite oxide having a layered structure (active material (2)) represented by $$Li(Li_xM_{1-x-y}Y_y)O_2 \quad \text{formula (2)}$$

wherein in the formula (2), 0≤x<0.3, 0≤y<0.3; M is at least one selected from the group consisting of Co, Fe, Ni and Mn; Y is at least one selected from the group consisting of Mg, Al, Zr, Ti and Zn.

2. The positive electrode according to claim 1, wherein in the formula (3), a is 1.05≤a≤2.0.

3. The positive electrode according to claim 1, wherein in the formula (3), x satisfies 0.5≤x<0.6.

4. The positive electrode according to claim 1, wherein in the formula (2), x satisfies 0<x<0.3.

5. The positive electrode according to claim 1, wherein the active material (2) is a composite oxide having a layered structure represented by the following formula (4):

Li(Li$_x$M1$_{1-x-z}$Mn$_z$)O$_2$     formula (4)

wherein in the formula (4), 0≤x<0.3, 0.3≤z≤0.7; M1 is at least one selected from the group consisting of Co, Ni and Fe.

6. The positive electrode according to claim 5, wherein in the formula (4), x satisfies 0<x<0.3.

7. The positive electrode according to claim 1, wherein the total content of the layered composite oxide represented by the formula (2) in the positive electrode active material is 2 to 70 wt %.

8. The positive electrode according to claim 1, wherein the total content of the layered composite oxide represented by the formula (2) in the positive electrode active material is 5 to 50 wt %.

9. A lithium ion secondary battery, comprising the positive electrode according to claim 1 and a negative electrode.

10. The lithium ion secondary battery according to claim 9, wherein the negative electrode comprises a metal that can be alloyed with lithium or a metal oxide that can absorb and desorb a lithium ion.

11. The lithium ion secondary battery according to claim 9, wherein the negative electrode comprises Si oxide.

12. A vehicle equipped with the secondary battery according to claim 9.

* * * * *